United States Patent
Hamada et al.

(10) Patent No.: US 7,510,626 B2
(45) Date of Patent: Mar. 31, 2009

(54) CARBON FIBER PAPER AND POROUS CARBON ELECTRODE SUBSTRATE FOR FUEL CELL THEREFROM

(75) Inventors: Mitsuo Hamada, Aichi (JP); Hidehiko Ohashi, Aichi (JP); Kazushige Mihara, Aichi (JP); Tomoyoshi Chiba, Aichi (JP); Makoto Nakamura, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 755 days.

(21) Appl. No.: 10/511,169

(22) PCT Filed: Apr. 9, 2003

(86) PCT No.: PCT/JP03/04482

§ 371 (c)(1), (2), (4) Date: Oct. 14, 2004

(87) PCT Pub. No.: WO03/087470

PCT Pub. Date: Oct. 23, 2003

(65) Prior Publication Data

US 2005/0150620 A1   Jul. 14, 2005

(30) Foreign Application Priority Data

Oct. 9, 2001 (JP) .............................. 2001-311549
Apr. 17, 2002 (JP) .............................. 2002-114725

(51) Int. Cl.
D21H 13/50 (2006.01)
H01M 4/96 (2006.01)

(52) U.S. Cl. .................. 162/138; 162/157.4; 429/42

(58) Field of Classification Search ................. 162/138, 162/145, 146, 157.4, 152; 429/42, 43
See application file for complete search history.

(56) References Cited

U.S. PATENT DOCUMENTS

| 4,565,727 | A | * | 1/1986 | Giglia et al. ................ 428/172 |
| 4,647,360 | A | * | 3/1987 | Waters et al. ............... 204/296 |
| 4,737,889 | A | * | 4/1988 | Nishino et al. .............. 361/502 |
| 4,851,304 | A | * | 7/1989 | Miwa et al. .................. 429/40 |
| 6,713,034 | B2 | * | 3/2004 | Nakamura et al. ....... 423/447.2 |

(Continued)

FOREIGN PATENT DOCUMENTS

CN   1344039 A   4/2002

(Continued)

OTHER PUBLICATIONS

Notification of Transmittal of Copies of Translation of the International Preliminary Examination Report (PCT/IB/338), re PCT/JP2003/004482, dated Jan. 13, 2005.

(Continued)

*Primary Examiner*—Eric Hug
(74) *Attorney, Agent, or Firm*—Fitch, Even, Tabin & Flannery

(57) ABSTRACT

A carbon fiber paper including carbon fibers having a surface area ratio of 1.05 or more, and a porous carbon electrode substrate for a fuel cell having this carbon fiber paper as a constituent. The electrode substrate for a fuel cell has carbon fibers uniformly dispersed therein and is flexible. The carbon fiber paper is suitable for production of the electrode substrate.

16 Claims, 5 Drawing Sheets

U.S. PATENT DOCUMENTS

| | | | |
|---|---|---|---|
| 7,297,445 B2 * | 11/2007 | Nakamura et al. | 429/231.8 |
| 2002/0175073 A1 | 11/2002 | Nakamura et al. | |

FOREIGN PATENT DOCUMENTS

| | | |
|---|---|---|
| EP | 1091372 A1 | 4/2001 |
| JP | 63-254669 A | 10/1988 |
| JP | 5-44779 B2 | 7/1993 |
| JP | 07-220735 A | 8/1995 |
| JP | 08-283084 A | 10/1996 |
| JP | 09-324390 A | 12/1997 |
| JP | 11-185771 A | 7/1999 |
| JP | 2000-036433 A | 2/2000 |
| JP | 2000-160436 A | 6/2000 |
| JP | 2000-331892 A | 11/2000 |
| JP | 2003-73932 A | 3/2003 |
| WO | WO 01/56103 A1 | 8/2001 |

OTHER PUBLICATIONS

International Preliminary Examination Report (PCT/IPEA/409), re PCT/JP2003/004482, dated Apr. 14, 2004.

"Carbon Fiber Production," Chemiefasern/Textilindustrie, vol. 39/91, No. 12, Dec. 1989.

Kawada et al., "Characteristic of Bending Fracture in C/C Composition-Effect of Reinforcement Fiber on Fracture Mechanism," The Official Journal of the Japan Society for Composite Materials, 19.2, pp. 72-78, 1995.

Kobayashi, "High Performance Paper Overview," Institute of Processing Technology, 1993.

* cited by examiner

CARBON FIBER PAPER AND POROUS CARBON ELECTRODE SUBSTRATE FOR FUEL CELL THEREFROM

CROSS-REFERENCED APPLICATIONS

This application is the National Stage of International Application PCT/JP03/04482, filed Apr. 9, 2003, the complete disclosure of which is incorporated herein by reference, which designated the U.S. and that International Application was not published under PCT Article 21(2) in English.

TECHNICAL FIELD

The present invention relates to a carbon fiber paper and a porous carbon electrode substrate for a fuel cell using the carbon fiber paper.

BACKGROUND ART

An electrode for a fuel cell need to have gas diffusibility and permeability, a strength capable of withstanding the handling, flexibility, a strength capable of withstanding the compression applied when they are produced or assembled into a cell, and so forth. Solid polymer electrolyte fuel cells, in particular, need to be small as compared with phosphoric acid fuel cells, and require thin electrodes. In such fuel cells, the electrodes use, as the electrode substrate, mainly a carbon fiber paper or a carbon fiber fabric. In the carbon fiber paper, in particular, the dispersion of carbon fibers is important and, when the paper is formed in a state that the carbon fibers are not spread from each other and form a bundle, there have been various problems, for example, the non-uniform thickness and non-uniform gas permeability of the paper formed and the difficulty of uniform coating of a catalyst on the electrode substrate produced from the paper.

In, for example, JP-A-11-185771 is disclosed a fiber of 1 to 4 μm in fiber diameter which is convertible into a carbon fiber, or a paper comprising a carbon fiber of 0.5 to 3 μm in fiber diameter. Use of such a small-diameter fiber contributes to a reduction in electrode-inside electrical resistance but makes very difficult the dispersion of fibers when a paper is produced therefrom; therefore, it is difficult to obtain therefrom a carbon fiber paper having carbon fibers uniformly dispersed therein and, when an electrode substrate was produced using the paper, there have arisen the above-mentioned problems such as non-uniform thickness.

DISCLOSURE OF THE INVENTION

Solving such problems, objectives of the present invention are to provide an electrode substrate for a fuel cell which has carbon fibers dispersed more uniformly, and is flexible, and to provide a carbon fiber paper which is suitable for production of such an electrode substrate.

According to the present invention, there is provided a carbon fiber paper comprising carbon fibers having a surface area ratio of 1.05 or more.

The carbon fibers have an average diameter of preferably less than 5 μm.

The carbon fibers have an average diameter of preferably more than 3 μm.

The carbon fibers have an average fiber length of preferably at least 2 mm and at most 18 mm, more preferably at least 3 mm and at most 6 mm.

The carbon fiber paper is obtained preferably by wet papermaking.

In the carbon fiber paper obtained by wet papermaking, it is preferred that the ratio of the MD strength, which is a tensile strength in the papermaking direction of the carbon fiber paper, and the CMD strength, which is a tensile strength in the width direction which forms a 90 degree angle with the papermaking direction, is at least 1.0 and at most 2.5 in terms of MD strength/CMD strength.

According to the present invention, there is provided a porous carbon electrode substrate for a fuel cell, comprising the above-mentioned carbon fiber paper.

In this porous carbon electrode substrate for a fuel cell, it is preferred that the substrate has a structure in which at least two carbon fiber papers each containing a carbonized resin are laminated and, in the substrate, at least one of the carbon fiber papers is a carbon fiber paper comprising carbon fibers having a surface area ratio of 1.05 or more.

In the porous carbon electrode substrate for a fuel cell, it is preferred that the substrate has a structure in which the plurality of carbon fiber papers each containing a carbonized resin are the same kind and are laminated in such a state that the same sides of the papers are each directed outward. Or, it is preferred that the porous carbon electrode substrate for a fuel cell comprises, as the carbon fiber paper containing a carbonized resin, besides a first carbon fiber paper which is the carbon fiber paper comprising carbon fibers having a surface area ratio of 1.05 or more, at least one second carbon fiber paper which is a carbon fiber paper comprising carbon fibers having an average diameter of at least 6 μm and at most 20 μm and an average fiber length of at least 2 mm and at most 18 mm.

In the porous carbon electrode substrate for a fuel cell, it is preferred that the carbon fiber paper comprising carbon fibers having a surface area ratio of 1.05 or more is arranged as at least one outermost layer of the electrode substrate and the outer side of this outermost layer carbon fiber paper has a surface roughness of 5 μm or less.

The porous carbon electrode substrate for a fuel cell is preferred to have a thickness of at least 0.05 mm and at most 0.5 mm and a bulk density of at least 0.3 g/cm$^3$ and at most 0.8 g/cm$^3$, and also have a bending strength of 50 MPa or more and a deflection of 1.5 mm or more at the time of bending measured by a three-point bending test under the conditions of a strain speed of 10 mm/min, a distance between the supporting points of 2 cm and a test specimen width of 1 cm.

The porous carbon electrode substrate for a fuel cell has a tensile strength of preferably 25 MPa or more.

The porous carbon electrode substrate for a fuel cell is preferred to be windable around a roll of 40 cm or less in outer diameter, and to have a length of 1 m or more.

The porous carbon electrode substrate for a fuel cell is preferred to contain a carbonized resin in an amount of at least 10% by mass and at most 50% by mass.

In the porous carbon electrode substrate for a fuel cell, it is preferred that the ratio of the MD surface resistance which is a surface resistance in the papermaking direction of the carbon fiber paper and the CMD surface resistance which is a surface resistance in the width direction which forms a 90 degree angle with the papermaking direction, is at least 1.0 and at most 2.5 in terms of MD surface resistance/CMD surface resistance.

Figure 1:
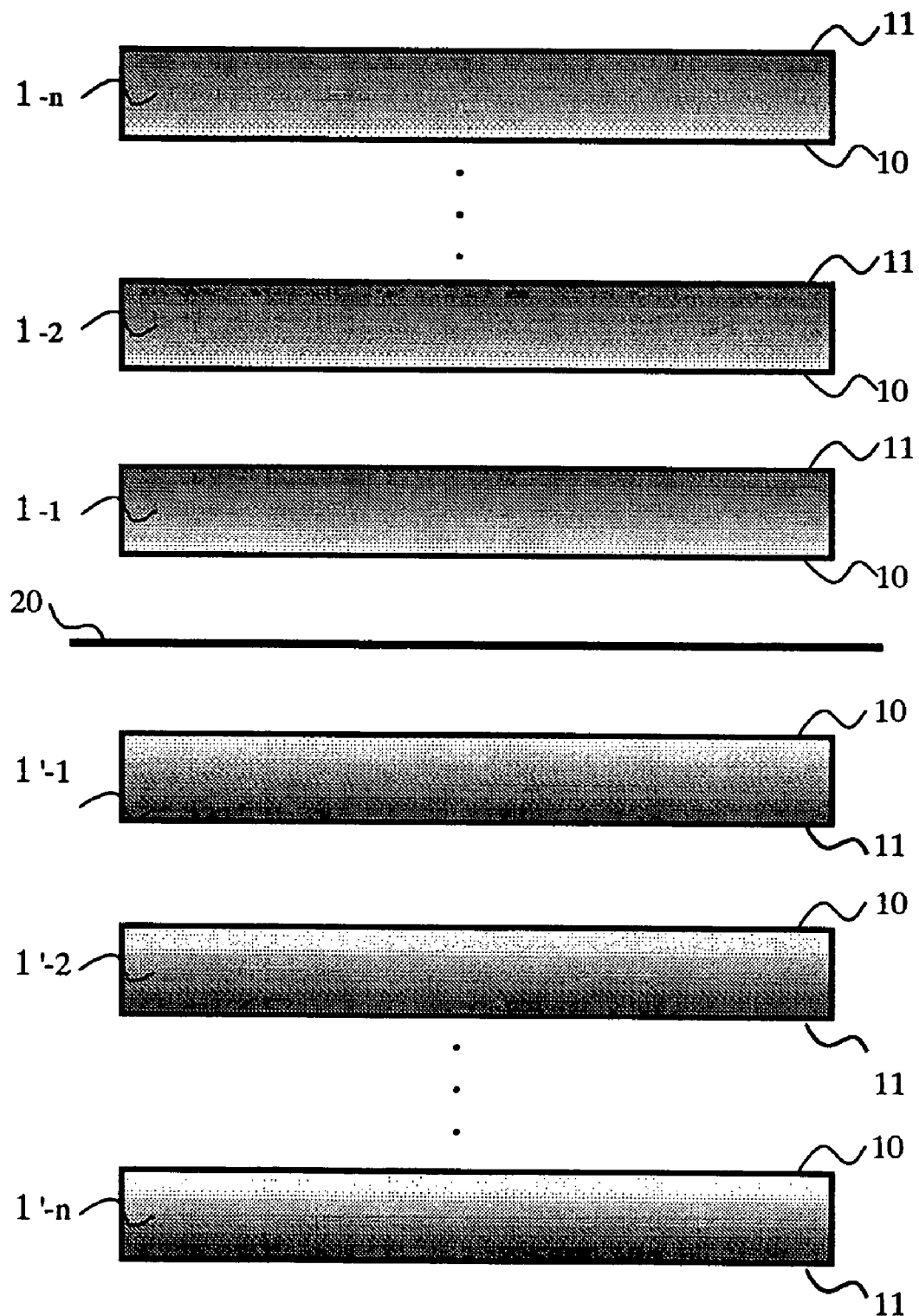
FIG. 1 is a conceptual drawing for explaining one embodiment of the electrode substrate of the present invention.

1, 1' and 1": resin-impregnated carbon fiber paper, 2: mold releasing agent-coated substrate, 3a and 3b: continuous belt apparatus, 4: preheating zone, 5: heating and pressing zone, 10: back side of a resin-impregnated carbon fiber paper, 11: front side of a resin-impregnated carbon fiber paper, 20: center line.

BEST MODE FOR CARRYING OUT THE INVENTION

The carbon fiber paper of the present invention is allowed to include carbon fibers having a surface area ratio of 1.05 or more (the fibers are hereinafter called "high-surface-area-ratio carbon fibers" in some cases).

Carbon fibers have a flat or uneven surface structure, depending upon the method for production of precursor fibers thereof. For example, acrylic fibers obtained by wet spinning of precursor fibers of carbon fibers have, on the surface, an uneven structure derived from a fibril structure; and the carbon fibers generally inherit this surface structure. Therefore, high-surface-area-ratio carbon fibers can be obtained by wet spinning of precursor fibers. Friction coefficients of fibers differ depending on the configuration of the surface structure. Fibers of high surface area ratio, in particular, are preferred because they have a low friction coefficient and spread easily without bundling. For the above reason, carbon fibers having a surface area ratio of 1.05 or more show high spreadability; thereby, carbon fiber bundles decrease in a papermaking step and carbon fibers are dispersed more uniformly.

The carbon fiber paper of the present invention includes the high-surface-area-ratio carbon fibers in an amount of preferably 50% by mass or more, more preferably 70% by mass or more, in order to reduce the formation of carbon fiber bundles.

Also, in order to achieve a higher spreadability, it is preferred that all of the carbon fibers in the carbon fiber paper are the high-surface-area-ratio carbon fibers.

The high-surface-area-ratio carbon fibers used in the present invention have an average diameter of preferably less than 5 μm. By using such small-diameter carbon fibers, it is possible to realize a porous carbon electrode substrate having a bending strength, flexibility and a high electrical conductivity. When the carbon fibers in the carbon fiber paper consist only of carbon fibers having an average diameter of 5 μm or more, there are tendencies that the carbon fiber paper is inferior in flexibility and that bonding points between carbon fibers become less. And the electrode produced from such a carbon fiber paper is disadvantageous in that the electrode tends to have a large electrical resistance. Meanwhile, the high-surface-area-ratio carbon fibers have an average diameter of preferably more than 3 μm, in view of the dispersibility of carbon fibers in papermaking. An average fiber diameter of more than 3 μm is preferred because the reduction in gas permeability due to the denseness of carbon fiber paper can be prevented.

Meanwhile, the high-surface-area-ratio carbon fibers have an average fiber length of preferably at least 2 mm and at most 18 mm, more preferably at least 2 mm and at most 10 mm, further preferably at least 3 mm and at most 6 mm, in view of the strength of electrode substrate and the uniform dispersibility of carbon fibers. With a fiber length of 2 mm or more, the low entanglement between fibers can be appropriately prevented and an electrode substrate of high strength can be obtained. With a fiber length of 18 mm or less, the dispersibility of the fibers in a dispersion medium is high and a carbon fiber paper low in dispersion non-uniformity can be obtained.

The carbon fibers contained in the carbon fiber paper of the present invention may be any of a polyacrylonitrile-based carbon fiber, a pitch-based carbon fiber, a rayon-based carbon fiber, etc. However, a polyacrylonitrile-based carbon fiber which is relatively high in mechanical strengths is preferred, and it is particularly preferred that the carbon fibers in the carbon fiber paper consist only of a polyacrylonitrile-based carbon fiber. The polyacrylonitrile-based carbon fiber referred to herein is one produced using, as a raw material, a polymer composed mainly of acrylonitrile. The polyacrylonitrile-based carbon fiber can be obtained, for example, through a spinning step of spinning a acrylonitrile-based fiber, a flame-retarding step of heating and firing the fiber in an air atmosphere of at least 200° C. and at most 400° C. to convert the fiber into an oxidized fiber, and a carbonizing step of heating and carbonizing the oxidized fiber in an inert atmosphere of nitrogen, argon, helium or the like at least at 300° C. and at most at 2,500° C. The polyacrylonitrile-based carbon fiber can be suitably used as a reinforcing fiber for composite material. Therefore, the polyacrylonitrile-based carbon fiber, as compared with other carbon fibers, can form a carbon fiber paper which is higher in mechanical strengths. The polyacrylonitrile-based carbon fiber is contained in the carbon fiber paper in an amount of preferably 50% by mass or more, more preferably 70% by mass or more, from the viewpoint of keeping flexibility of the electrode substrate.

The carbon fiber paper of the present invention preferably contains an organic high-molecular-weight compound as a binder. As the organic high-molecular-weight compound, there may be used thermoplastic resins such as polyvinyl alcohol (PVA), polyvinyl acetate, polyester, polypropylene, polyethylene, polystyrene, polyvinyl chloride, polyvinylidene chloride, acrylic resin, polyurethane resin and the like; thermosetting resins such as phenolic resin, epoxy resin, melamine resin, urea resin, alkyd resin, unsaturated polyester resin, acrylic resin, polyurethane resin and the like; elastomers such as thermoplastic elastomer, butadiene-styrene copolymer (SBR), butadiene-acrylonitrile copolymer (NBR) and the like; rubber; cellulose; and so forth. Specifically, there may be preferably used a polyvinyl alcohol, a polyacrylonitrile, a cellulose, a polyvinyl acetate, etc.

The form of the organic high-molecular-weight compound is preferred to be a pulp form or a short fiber form. The "pulp form" referred to herein is a structure in which each fibrous trunk has, as branches, a large number of fibrils of several micrometers or less in diameter. In the sheet obtained using an organic high-molecular-weight compound in the form of pulp, fibers are entangled with each other effectively; therefore, the sheet, even when it is thin, has an advantage that it is superior in the handling property. The short fiber form is obtained by cutting a fiber yarn or a fiber tow into a given length. The length of the short fiber is preferred to be at least 2 mm and at most 12 mm from the standpoints of the binding ability as a binder and the dispersibility.

The organic high-molecular-weight compound is preferred to be a polyvinyl alcohol in the form of a pulp or short fibers. The polymerization degree of the polyvinyl alcohol is preferred to be at least 300 and at most 2,500. With the polyvinyl alcohol, a high bonding strength is obtained in a papermaking step and the detachment of short carbon fibers takes place hardly; therefore, the polyvinyl alcohol is a preferred binder. The polyvinyl alcohol is also preferred because the most part thereof decomposes and vaporizes in the final carbonization step in production of electrode substrate, which forms pores, and the presence of these pores improves the permeabilities of water and gas.

The content of the organic high-molecular-weight compound in the carbon fiber paper is in a range of preferably at least 5% by mass and at most 40% by mass, more preferably at least 10% by mass and at most 30% by mass. In order to allow the electrode substrate obtained by impregnating the carbon fiber paper with a resin (described later) and firing the resin-impregnated carbon fiber paper, to have a low electrical resistance, the content of the organic high-molecular-weight compound is desired to be low, preferably at most 40% by mass. The content is preferred to be at least 5% by mass from the viewpoint of keeping the strength and the shape of the carbon fiber paper.

As the papermaking method for producing the carbon fiber paper, there may be used a wet method of dispersing carbon fibers in a liquid medium and conducting papermaking, and a dry method of dispersing carbon fibers in the air and settling them. Among them, the wet method is preferred. A continuous method is preferred to a batch method in view of the productivity and mechanical strengths of the carbon fiber paper obtained. As the continuous wet method, there may be used a known method which is used in continuous papermaking of a paper or the like from fibers such as pulp. As examples thereof, there can be mentioned continuous papermaking methods such as cylinder method, Fourdrinier method, short-net method and the like. Carbon fibers, as compared with fibers such as pulp, are low in bonding strength between fibers; therefore, a considerable amount of a binder is required in continuous papermaking by the cylinder method. Hence, the Fourdrinier method or the short-net method is preferred. The carbon fiber paper obtained by hand papermaking, as compared with that obtained by continuous papermaking, tends to be thick and low in bulk density. Therefore, the carbon fiber paper obtained by hand papermaking is disadvantageous in that it tends to be inferior in strength even when impregnated with a resin and then pressed, and in that it is not easy to control the areal weight of paper. Accordingly, the continuous papermaking is preferred to the hand papermaking.

It is also preferred that a water jet is applied to the carbon fiber paper to successively form holes of at least 50 μm and at most 200 μm in diameter and also intensify the entanglement between carbon fibers. By thus forming holes, the carbon fiber paper is increased not only in gas permeability but also in strength of length-wise direction as compared with when having no hole. For increasing gas permeability, there are also a method of forming holes with a thin needle and a method of impregnating a foamable resin into the carbon fiber paper and generating voids; however, these methods are disadvantageous in that they invite a reduction in strength of electrode substrate. Therefore, the above-mentioned application of water jet is preferred. Since the application of water jet invites no change in the areal weight of carbon fiber paper, there takes place no reduction in electrical conductivity.

Further, when forming holes successively, the holes may be formed at constant space intervals. Successive formation of holes at constant space intervals enables uniform and increased gas permeability.

In order to successively form holes of at least 50 μm and at most 200 μm in diameter and intensify the entanglement between carbon fibers, high-pressure water jets are applied to the carbon fiber paper at constant time intervals from a nozzle having orifices of at least 5 μm and at most 50 μm in diameter aligned at equal space intervals; thereby, the carbon fibers which exist in portions to which the water jets have been applied are moved and are entangled with nearby carbon fibers. The extent of entanglement between carbon fibers can be adjusted by the pressure of the water jet applied.

As described above, it is preferred to mix, with carbon fibers, an appropriate amount of an organic high-molecular-weight compound as a binder for bonding the carbon fibers with each other. As the method for mixing, into carbon fibers, an organic high-molecular-weight compound of, for example, pulp form or short fiber form, there are a method of stirring and dispersing the compound together with the carbon fibers in water, and a method of directly mixing the compound into the carbon fibers. The method of stirring and dispersing in water is preferred from the viewpoints that carbon short fibers have high electrical conductivity and may easily cause the short-circuit of electric facilities, and that uniform dispersion is important. By thus mixing an organic high-molecular-weight compound, it is possible to keep the strength of the resulting carbon fiber paper and to prevent the peeling of carbon fibers off the carbon fiber paper during papermaking, or the change in orientation of carbon fibers.

It is possible to make the orientation and thickness of carbon fibers more uniform by hot-pressing the carbon fiber paper using a hot-press roll after papermaking. Incidentally, this hot-pressing is a post-treatment in papermaking and is different from the hot-pressing conducted in the later-described electrode substrate production.

Papermaking is conducted by a continuous method or a batch method. For production of the carbon fiber paper of the present invention, continuous papermaking is preferred. In the carbon fiber paper produced by continuous papermaking, the ratio of the tensile strength in the papermaking direction (MD) and the tensile strength in the width direction (CMD) which forms a 90 degree angle with the papermaking direction, i.e. the MD strength/CMD strength is preferably 1.0 or more, more preferably 1.2 or more. The ratio of MD strength/CMD strength of the carbon fiber paper is a value reflecting the orientation of fibers in the carbon fiber paper. As the value is smaller, the carbon fiber paper tends to have a larger thickness. Therefore, the ratio of MD strength/CMD strength is preferably 1.0 or more, more preferably 1.2 or more, further preferably 1.3 or more from the viewpoint of controlling the thickness of the carbon fiber paper. Meanwhile, the MD strength/CMD strength is preferably 2.5 or less, more preferably 2.0 or less. The ratio of MD strength/CMD strength is succeeded by the porous electrode substrate obtained finally. Therefore, when the value of the ratio is small, the porous carbon electrode substrate obtained finally is low in anisotropy of in-plane resistance and accordingly there can be obtained a fuel cell showing excellently stable performances; therefore, a smaller value of MD strength/CMD strength is preferred. From the above standpoints, in the porous carbon electrode substrate of the present invention, the ratio of the surface resistance in the papermaking direction (MD) of carbon fibers and the surface resistance in the direction (CMD) which forms 90 degree angle with the papermaking direction, i.e. the MD surface resistance/CMD surface resistance is preferably at least 1.0 and at most 2.5.

The porous carbon electrode substrate for a fuel cell according to the present invention has, as a constituent, a carbon fiber paper which includes the above-mentioned high-surface-area-ratio carbon fibers. Owing to this, the carbon fibers are dispersed more uniformly in the electrode substrate and the substrate exhibits uniform properties.

The porous carbon electrode substrate for a fuel cell, referred to herein includes a carbonaceous substance such as carbon fibers as the main constituent, and is a substrate having water or gas permeability and high electrical conductivity sufficient to function as an electrode of a fuel cell.

The gas permeability of the porous electrode substrate is preferably 50 ml·mm/hr·cm$^2$·mmAq (5 ml·mm/hr·cm$^2$·Pa) or more. With respect to the electrical conductivity, the through-plane resistivity is preferably 10 mΩ/cm$^2$ or less in the case where the resistivity value is measured by applying electric current with current density of 10 mA/cm$^2$ while the electrode substrate being sandwiched between copper plates and pressurized at 1 MPa from the upper and the lower sides of the copper plates.

The porous carbon electrode substrate for a fuel cell according to the present invention preferably contains, as a binding agent for carbon fibers, a carbonized resin (described later) which is a carbonization product derived from a thermosetting resin.

In the electrode substrate for a fuel cell, having a structure in which at least two carbon fiber papers each containing a carbonized resin are laminated, it is preferable that the substrate comprises at least one carbon fiber paper (first carbon fiber paper) which includes the above-mentioned high-surface-area-ratio carbon fibers as a constituent.

The carbonized resin has the properties of carbon material such as electrical conductivity and corrosion resistance, and also bonds short carbon fibers with each other to impart mechanical properties to the carbon fiber paper. The carbonized resin is different from the carbon fiber paper and is contained in the carbon fiber paper in a state adhered to the carbon fibers constituting the carbon fiber paper.

The carbonized resin may be any substance as long as it is a carbonaceous substance. However, it is preferably a substance obtained by firing a thermosetting resin at high temperatures. The thermosetting resin used herein is preferably a substance which is sticky or fluid at ordinary temperature and, after carbonization, remains as an electrically conductive substance. There may be used a phenolic resin, a furan resin, etc., as the thermosetting resin.

As the phenolic resin, there may be used a resole type phenolic resin obtained by a reaction of a phenol and an aldehyde in the presence of an alkali catalyst. It is possible to dissolve and mix, in the resole type phenolic resin (fluid), a novolac type phenolic resin (solid and heat-fusible) formed by a reaction between a phenol and an aldehyde in the presence of an acidic catalyst by a known method. In this case, the novolac type phenolic resin is preferably a self-crosslinkable type containing a curing agent, for example, hexamethylenediamine. As the phenol, there may be used, for example, phenol, resorcin, cresol and xylol. As the aldehyde, there may be used, for example, formalin, paraformaldehyde and furfural. These may be used as a mixture. The phenolic resin may be a commercial product.

The amount of the thermosetting resin impregnated is preferably at least 30 parts by mass and at most 150 parts by mass, further preferably at least 40 parts by mass and at most 100 parts by mass per 100 parts by mass of the carbon fiber paper. The proportion in which the thermosetting resin remains as a final carbonization product in the porous carbon electrode substrate, differs depending upon the kind of the resin and the amount of the resin impregnated into the carbon fiber paper. When the amount of the porous carbon electrode substrate is taken as 100% by mass, the content of the carbonization product derived from the thermosetting resin, excluding the amount of the carbon fibers is preferably at least 10% by mass and at most 50% by mass, more preferably at least 20% by mass and at most 40% by mass, in view of the bondability between carbon fibers in electrode substrate and the flexibility of electrode substrate. Properties of a liquid used for the impregnation is adjusted so as to be able to obtain the above content.

In the electrode substrate for a fuel cell, having a structure in which at least two carbon fiber papers each containing a carbonized resin are laminated, it is preferred that the same carbon fiber papers are laminated in such a state that their same sides are each directed to either outer surface of the electrode substrate. The same carbon fiber papers referred to herein are carbon fiber papers each containing a carbonized resin, produced by using the same material, the same method, the same conditions and the same apparatus.

As described above, the carbon fiber paper is produced preferably by wet papermaking. However, particularly in the wet papermaking, it is difficult to allow the front side and back side of the paper produced to have a small difference in texture. The reason is that in the wet papermaking, carbon fibers settle downward through a liquid medium and deposit on a mesh-shaped sheet, whereby the front side and the back side tend to have different textures. Particularly when the carbon fiber paper has a large basis weight, there are cases that the front side and the back side have remarkably different properties. Thus, it is disadvantageous to merely laminate the carbon fiber papers of same kind in that the resulting electrode substrate tends to have warpage.

Figure 2:
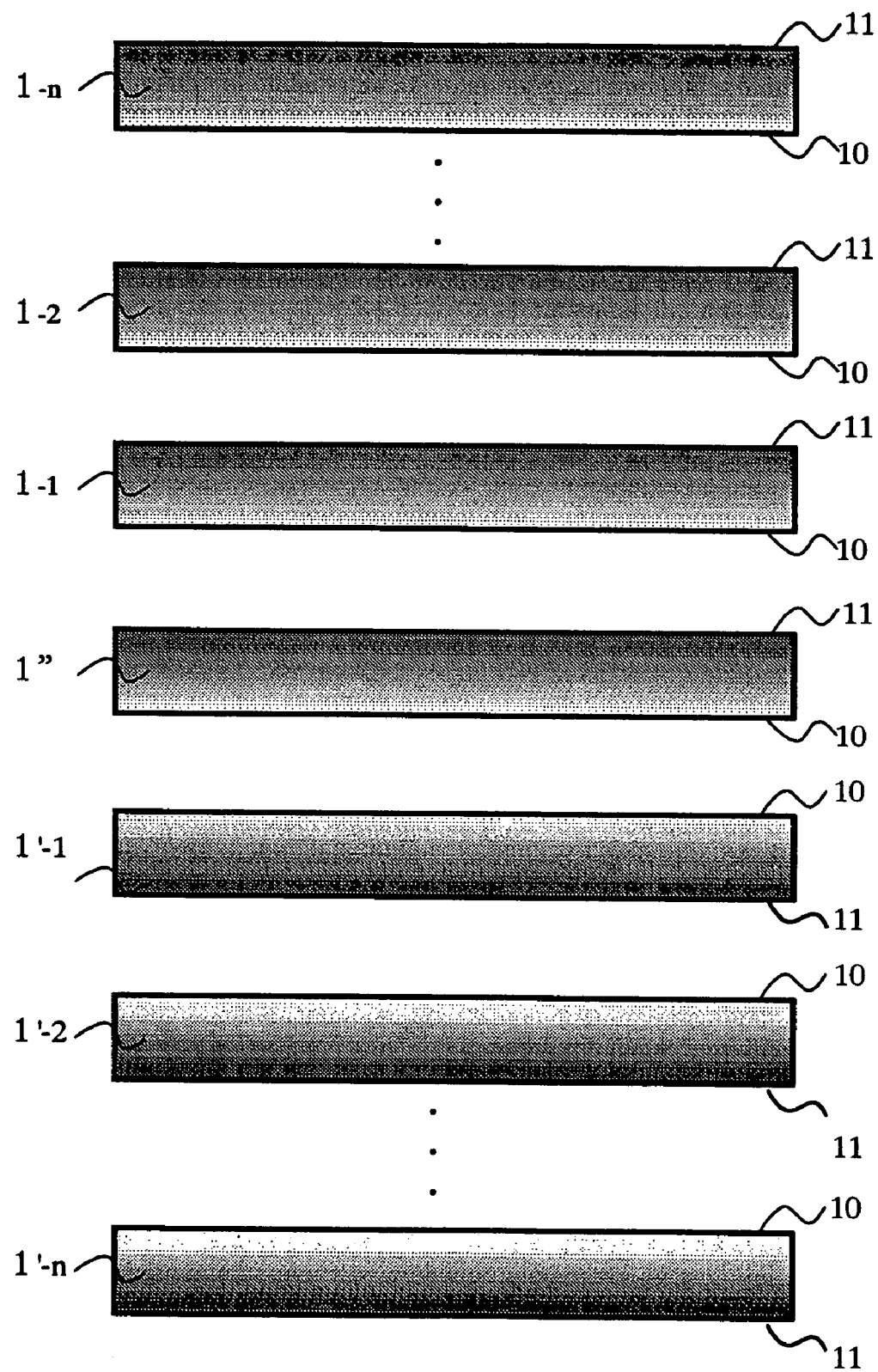
FIG. 2 is a conceptual drawing for explaining another embodiment of the electrode substrate of the present invention.

The mode of lamination of carbon fiber papers is explained by way of FIG. 1 and FIG. 2. In order to prevent the above-mentioned warpage on the front side and the back side of a carbon fiber paper, as shown in FIG. 1, it is preferred to laminate carbon fiber papers 1 and 1' of same kind in such a manner that the same sides (here, the back sides 10 of the papers) are arranged inward and the same sides (here, the front sides 11 of the papers) are arranged outward. Since each carbon fiber paper is obtained by wet papermaking in which carbon fibers are settled downward, the front side and the back side are produced. However, by orienting each of the sides in the same conditions (here, the front sides 11 of the papers) outward, the curing of resin when the resin-impregnated carbon fiber papers are hot-pressed and the shrinkage during the carbonization of the resin proceed at about the same degree at the front side and back side of the electrode substrate; as a result, the warpage can be prevented.

The method of lamination is explained in more detail. When 2n (n is a positive integer) carbon fiber papers are laminated, it is preferred that as shown in FIG. 1, lamination is made so that the back sides 10 of all carbon fiber papers point toward a center line 20. That is, it is preferred that n carbon fiber papers $1_{-1}$ to $1_{-n}$ point toward one direction and n carbon fiber papers $1'_{-1}$ to $1'_{-n}$ point toward a direction opposite thereto.

When 2n+1 (n is a positive integer) carbon fiber papers are laminated, it is preferred that as shown in FIG. 2, a carbon fiber paper 1" placed at the center may point toward any direction and all other carbon fiber papers are placed with their back sides directed to the center. That is, it is preferred that n carbon fiber papers $1'_{-1}$ to $1'_{-n}$ point toward one direction and n carbon fiber papers $1'_{-1}$ to $1'_{-n}$ point toward a direction opposite thereto.

In the electrode substrate having a structure in which at least two carbon fiber papers each containing a carbonized resin are laminated, it is also preferred that there is used, as part of these plural carbon fiber papers, the above-mentioned first carbon fiber paper and there is further used, as a carbon fiber paper other than the first carbon fiber paper, a carbon fiber paper (second carbon fiber paper) comprising, as a constituent, carbon fibers having an average diameter of at least 6 μm and at most 20 μm and an average fiber length of at least 2 mm and at most 18 mm. The first carbon fiber paper and the second carbon fiber paper may be the same. The second carbon fiber paper comprises carbon fibers of relatively large diameters and accordingly is superior in gas permeability. Therefore, in the fuel cell, the second carbon fiber paper allows the reactant gases such as hydrogen and oxygen supplied from the separator of the fuel cell to uniformly distribute to the various portions of the catalyst layer (hereinafter, this ability is also called gas diffusibility), and allows the water generated in the catalyst layer to be efficiently discharged outside. From this standpoint, it is more preferred to use, as the second carbon-fiber paper, a carbon fiber paper comprising carbon fibers having a average diameter of at least 6 μm and at most 20 μm and an average fiber length of at least 2 mm and at most 18 mm.

It is preferred that the first carbon fiber paper is provided as at least one outermost layer of the laminate of carbon fiber papers and that the outer side of the outermost layer carbon fiber paper has a surface roughness of 5 μm or less. In, for example, the lamination mode of FIG. 1, the outermost layer carbon fiber papers are carbon fiber papers $1_{-n}$ and $1'_{-n}$ and the outer side 11 of at least one of these carbon fiber papers is allowed to have a surface roughness of 5 μm. In a fuel cell, it is preferred from the viewpoint of the performances of the fuel cell that an electrode substrate such as mentioned above is used therein and its side having a surface roughness of 5 μm is in contact with the catalyst layer. The surface roughness of a sample is an arithmetic average height of a contour curve which is obtained from the locus when a stylus is moved on the sample in the lengthwise and crosswise directions. The surface roughness of more than 5 μm is disadvantageous in that, in this case, the contact between the catalyst layer and the electrode substrate is loose, and the resulting electrical conductivity tends to be low, and in that there may be an influence of superfluous absorption of water from the catalyst layer into the electrode substrate.

The porous carbon electrode substrate for a fuel cell according to the present invention is preferred to have a thickness of at least 0.05 mm and at most 0.5 mm and a bulk density of at least 0.3 g/cm³ and at most 0.8 g/cm³ and also have a bending strength of 50 MPa or more and a deflection of 1.5 mm or more at the time of bending measured by a three-point bending test under the conditions of a strain speed of 10 mm/min, a distance between the supporting points of 2 cm and a test specimen width of 1 cm.

The thickness of the porous carbon electrode substrate is preferably at least 0.05 mm and at most 0.5 mm, more preferably at least 0.1 mm and at most 0.3 mm from the standpoints of the strength and resistance. A thickness of less than 0.05 mm is disadvantageous in that there is a tendency that the strength in the thickness direction is smaller and the handleability when the electrode substrate has been assembled into a cell stack decreases. A thickness of more than 0.5 mm is disadvantageous in that the electrical resistance tends to increase and in that the total thickness increases when a stack is assembled. The bulk density is preferably at least 0.3 g/cm³ and at most 0.8 g/cm³, more preferably at least 0.4 g/cm³ and at most 0.7 g/cm³. A bulk density of less than 0.3 g/cm³ is disadvantageous in that the electrical resistance tends to increase and the flexibility tends to decrease. A bulk density of more than 0.8 g/cm³ is disadvantageous in that the gas permeability tends to be lower and the fuel cell obtained tends to have lower performances.

The bending strength of the porous carbon electrode substrate of the present invention is preferably 50 MPa or more, more preferably 70 MPa or more under the conditions of strain speed: 10 mm/min, distance between the supporting points: 2 cm and test specimen width: 1 cm. A bending strength of less than 50 MPa is disadvantageous in that the handleability tends to be lower and cracks tend to appear more easily, for example, when the electrode substrate is wound around a roll. With a bending strength of 50 MPa or more, there can be obtained an electrode substrate which causes no crack when bent. The deflection when bent is preferably 1.5 mm or more, more preferably 2.0 or more. When the deflection is in this range, the electrode substrate hardly breaks when it is continuously wound around a roll, it is possible to produce a long electrode substrate, and the handleability of electrode substrate is superior.

The tensile strength of the electrode substrate is preferably 25 MPa or more, more preferably 30 MPa or more. A higher tensile strength is advantageous because such an electrode substrate, when continuously wound around a roll or in a subsequent post-processing step, can pass through these steps with no breakage even under tension.

The porous carbon electrode substrate for a fuel cell according to the present invention is preferred to have a length of 1 m or more and also preferred to be windable around a roll of 40 cm or less in outer diameter. When the electrode substrate is long and windable around a roll, the productivity of electrode substrate is higher, and also the subsequent step, i.e. the production step of MEA (membrane electrode assembly) can be conducted continuously. This greatly contributes to a cost reduction of the fuel cell. For this reason, the electrode substrate is preferred to be flexible so as to be windable around a roll of 40 cm or less, preferably 30 cm or less in outer diameter. A carbon electrode substrate which is windable around a roll of 40 cm or less in outer diameter, is preferred because it is superior in flexibility and is well passable through the subsequent step, i.e. the MEA production step. Further, the carbon electrode substrate, when windable around a roll of 40 cm or less, can be made into a compact product configuration and is advantageous in packaging and transportation cost.

In the present invention, the porous carbon electrode substrate for a fuel cell is preferably obtained by impregnating the above-mentioned carbon fiber paper with a thermosetting resin, curing the resin by hot pressing, and carbonizing the cured resin.

For impregnating the carbon fiber paper with a thermosetting resin, there is preferably used a method using a squeezing apparatus, or a method in which a thermosetting resin film is laminated on a carbon fiber paper. In the method using a squeezing apparatus, a carbon fiber paper is dipped into a thermosetting resin solution and the solution is uniformly coated on the whole carbon fiber paper using a squeezing apparatus, wherein the amount of the solution is adjusted by varying the distance between the rolls of the squeezing apparatus. When the thermosetting resin solution has a relatively low viscosity, a spraying method or the like may also be used. There may also be used a method in which a thermosetting resin solution is coated using a coater.

In the method using a thermosetting resin film, first, a thermosetting resin is coated on a release paper to obtain a thermosetting resin film. Then, the film is laminated on the carbon fiber paper, after which the laminate is subjected to a heating and pressing treatment to transfer the thermosetting resin onto the carbon fiber paper.

The heating and pressing step is preferably conducted continuously over the total length of the carbon fiber paper from the standpoint of productivity. Preheating is preferably conducted prior to the heating and pressing. In the preheating step, the thermosetting resin can be softened; in the subsequent heating and pressing step, the thickness of the electrode substrate produced can be well controlled using a press. By pressing the preheated, resin-impregnated carbon fiber paper at a temperature higher than the preheating temperature by at least 50° C., there can be obtained an electrode substrate having a desired thickness and a desired density. In order to obtain an electrode substrate having a desired thickness and a desired density, a plurality of resin-impregnated carbon fiber papers may be laminated and the laminate may be subject to heating and pressing.

The above-mentioned heating and pressing is conducted preferably by using a continuous hot press apparatus having a pair of endless belts or a continuous hot roll press apparatus. With the former continuous hot press apparatus, since an electrode substrate is conveyed by belts, the electrode substrate hardly receives tension. Therefore, the electrode substrate is hardly broken during the production and the apparatus is excellent in terms of through-passing property. The latter continuous hot roll press apparatus has a simple structure and its running cost is low. These two heating and pressing manners are suitable for continuously curing a thermosetting resin and is preferably used in production of the electrode substrate of the present invention.

In conducting continuous hot-pressing, it is preferred to coat a releasing agent on belts or rolls with which the carbon fiber paper comes in contact, or to sandwich the carbon fiber paper between releasing papers. Thereby, it is possible to prevent the carbon fiber paper from attaching to the belts or rolls. The releasing agent is preferably a silicon-based releasing agent. Particularly preferred is a releasing agent of a type capable of forming a film at high temperatures. When the releasing papers are used, their water content is preferably 4.0% by mass or less. A water content of more than 4.0% by mass is disadvantageous in that bulges may be found here and there on the surface of releasing paper when the water inside the paper vaporizes and these bulges may be transferred onto the carbon fiber paper by pressing.

The pressure applied when the continuous hot press apparatus having a pair of endless belts is used, is preferred to be at least $1.0 \times 10^4$ N/m and at most $5 \times 10^5$ N/m in terms of line pressure. The heating and pressing step is conducted to infiltrate a thermosetting resin sufficiently into the fibers and increase the bending strength. By applying a line pressure of at least $1.0 \times 10^4$ N/m in thermosetting of the resin, sufficient electrical conductivity and flexibility can be generated. By applying a line pressure of at most $5 \times 10^5$ N/m, the vapor generated from the resin in thermosetting can be sufficiently discharged outside and generation of cracks can be suppressed.

The temperature in the heating and pressing treatment is preferably at least 140° C. from the standpoint of thermosetting time and productivity and at most 400° C. from the standpoint of the cost for facilities such as continuous hot press apparatus. The temperature is more preferably at least 160° C. and at most 380° C. The temperature of the preheating is preferably in a range of at least 100° C. and at most 200° C.

Following the curing of resin, the carbonization of the resin is preferably conducted continuously over the total length of the carbon fiber paper. When an electrode substrate is long, the productivity of electrode substrate is high and the subsequent MEA production step can be conducted continuously, which greatly contributes to a cost reduction of the fuel cell. Specifically, the carbonization is conducted preferably by firing the carbon fiber paper in an inert atmosphere in a temperature range of at least 1,000° C. and at most 3,000° C., continuously over the total length of the carbon fiber paper. Prior to the carbonization by firing the carbon fiber paper in an inert atmosphere in a temperature range of at least 1,000° C. and at most 3,000° C., there may be conducted a pretreatment by firing the carbon fiber paper in an inert atmosphere in a temperature range of about 300° C. or more and about 800° C. or less.

The present invention is described more specifically by way of Examples.

The properties shown in Examples were measured by the following methods.

Properties Relating to Carbon Fiber Paper:
1) Surface Area Ratio of Carbon Fibers Single fibers were taken out from the carbon fibers to be evaluated and were cut into a length of 1.5 cm. Several cut single fibers were placed on a hemocover glass. The both ends of each cut single fiber were fixed with a commercially available white-out for letter correction to prepare a sample. Measurement was made for the sample using an atomic force microscope, SPI13700/SPA-300 (trade name) produced by Seiko Instruments, Inc., and a cantilever, SI-DF20 (trade made) produced by Olympus Optical Co. Ltd., in a DFM mode. The measurement was made at one point. The measurement was conducted for a randomly selected area of 2.5 μm×2.5 μm of the surface of each single fiber. The image obtained was subjected to two-dimensional Fourier transformation; the low-frequency component corresponding to the curvature of fiber surface was cut; then, inverse transformation was made to obtain an image of unevenness on the fiber surface. From this image was calculated the surface area ratio of carbon fiber in a cross-section mode.

2) Diameter of Carbon Fibers

The diameter of carbon fibers was measured by a helium-neon laser (SLB DIA MEASURING SYSTEM (trade name) produced by Anritsu Corporation was used) as described in JIS R 7601. The measurement was conducted for 100 carbon fibers and the average of the obtained values was taken as average diameter of carbon fibers.

3) Strength Ratio of Carbon Fiber Paper

From a carbon fiber paper were cut out 6 test pieces in which MD direction of the carbon fiber paper was the tensile direction and other 6 test pieces in which CMD direction was the tensile direction. The size of the test pieces were 15 mm×25 mm. The test pieces were measured for tensile strength according to JIS P 8113.

4) Dispersion State of Carbon Fibers

A sample of 30 cm×20 cm randomly taken out from a carbon fiber paper was observed visually. A sample was rated according to the number of observed non-spreading portions of 3 mm square or larger as follows:

Two or less: "A", three to five: "B", six or more: "C".

Properties Relating to Electrode Substrate:
5) Thickness, Basis Weight, Bulk Density, and Ratio of Carbonized Substance Other than Carbon Fiber in Electrode Substrate Thickness was measured using a thickness measurement apparatus, Dial Thickness Gauge 7321 (trade name) produced by Mitsutoyo Corporation. The size of the measuring gauge used was 10 mm in diameter and the pressure applied was 1.5 kPa.

Basis weight was determined by measuring the mass of a cut electrode substrate of 300 mm×200 mm and calculating the following equation.

Basis weight $(g/m^2)$=mass $(g)/0.06$ $(m^2)$

Bulk density was calculated from the following equation using the thickness (mm) and the basis weight both measured.

Bulk density $(g/cm^3)$=basis weight/(thickness×1000)

Ratio (mass %) of carbonized resin other than carbon fiber in electrode substrate was calculated from the following equation.

(Ratio of carbonized resin other than carbon fiber in electrode substrate)={(basis weight of electrode substrate)−(basis weight of carbon fiber paper)×(proportion of carbon fibers in carbon fiber paper)}/(basis weight of electrode substrate)×100

6) Bending Strength of Electrode Substrate

Ten test pieces each of 80 mm×10 mm were cut out from an electrode substrate, in such a manner that the MD direction (papermaking direction) of the electrode substrate became the long side of each test piece. A load was applied to each test piece using a bending strength testing apparatus under the conditions of distance between the supporting points of 2 cm and strain speed of 10 mm/min. For the ten test pieces, the breaking load of the pressing wedge from the start of the load application to the breakage of the test piece. The bending strength was calculated according to the following equation was measured.

Bending strength $(MPa)=3PL/2Wh^2$

P: breaking load (N)
L: distance between the supporting points (mm)
W: width of test piece (mm)
h: height of test piece (mm)

7) Deflection of Electrode Substrate

As in the above 6), a load was applied to each test piece under the conditions of distance between the supporting points of 2 cm and strain speed of 10 mm/min, and a moving distance of the pressing wedge from the start of load application to the breakage of the test piece was measured. This distance was taken as the deflection of electrode substrate.

8) Surface Resistance

A test piece of 10 cm×2 cm was cut out from an electrode substrate. On one side thereof were placed four copper wires at intervals of 2 cm. According to a four-terminal method, an electric current was allowed to flow at a current density of 10 mA/cm$^2$ and a resistance was measured. The resistance measurement was conducted in the MD and CMD directions and a ratio of the MD resistance and the CMD resistance was determined.

9) Gas Permeability Coefficient

Using a Gurley densometer, a time taken for a gas in 200 mm$^3$ volume to pass through was measured under the condition of hole area of 0.79 cm$^2$ to calculate the gas permeability coefficient.

10) Measurement of Through-Plane Resistivity

A resistivity value was measured by applying electric current with current density of 10 mA/cm$^2$ while a sample being sandwiched between copper plates and pressurized at 1 MPa from the upper and the lower sides of the copper plates and the through-plane resistivity of the electrode substrate in the thickness direction was calculated based on the following equation.

Through-plane resistivity $(\Omega \cdot cm^2)$=measured resistivity value $(\Omega)$×sample area $(cm^2)$ 11) Tensile Strength of Electrode Substrate A test piece of 15 mm (width)×100 mm (length) was cut out from an electrode substrate, and a tensile test was conducted at a tensile speed of 2 mm/min. The measurement was conducted ten times and the average thereof was taken as the tensile strength.

12) Surface Roughness

A surface roughness tester, Surftest SJ-402 (trade name) produced by Mitsutoyo Corporation was used. A stylus (a diamond chip of 5 μm in diameter) was moved on a cut sample of 6 cm×6 cm in the lengthwise and crosswise directions; a contour curve was drawn from the locus of its movement; an arithmetic average height Ra of the contour curve was read; the height Ra was taken as surface roughness.

EXAMPLE 1

A acrylonitrile-based copolymer was dissolved in dimethylacetamide to prepare a spinning solution (polymer concentration: 21% by mass, solution temperature: 70° C.).

The spinning solution was discharged into an aqueous dimethylacetamide solution (concentration: 30% by mass, bath temperature: 50° C.) using a spinneret (diameter: 0.045 mm, number of orifices: 50,000), to obtain coagulated fibers. The coagulated fibers were subjected to washing and solvent removal in boiling water while being drawn; the resulting fibers were dipped in a silicon-based oiling agent, and dried and densified with a hot roller. Successively, they were drawn with a dry hot roller to obtain precursor fibers.

The precursor fibers were fired by a known method to obtain carbon fibers having a surface area ratio of 1.09 and an average fiber diameter of 4 μm. The carbon fiber bundle was cut to obtain short fibers having an average fiber length of 3 mm.

Next, the short fiber bundle was uniformly dispersed in water in a slurry tank of a short-net wet continuous papermaking apparatus to give rise to spreading and sufficient dispersion. Therein were uniformly dispersed, as a binder, polyvinyl alcohol (PVA) short fibers (cut length: 3 mm), VBP 105-1 (trade name) produced by Kuraray Co., Ltd. in an amount of 14% by mass relative to the total amount of the carbon fibers and the PVA. The mixture was sent out of the tank, and the resulting web was passed through a short-net plate and dried by a dryer to obtain a carbon fiber paper having a length of 20 m. The carbon fiber paper was evaluated as mentioned previously. It has carbon fibers well dispersed therein. The results are shown in Table 1.

Next, the carbon fiber paper was impregnated with a thermosetting resin by a dip nip method. That is, the carbon fiber paper was fed continuously into a tray of a methanol solution containing 20% by mass of a phenolic resin, Phenolite J-325 (trade name) produced by Dainippon Ink and Chemicals, Inc.; the resin was squeezed using a squeezing apparatus; the resulting paper was dried by continuously blowing hot air, to obtain a resin-impregnated carbon fiber paper. 130 parts by mass of the phenolic resin had been adhered to 100 parts by mass of the carbon fiber paper.

Figure 3:
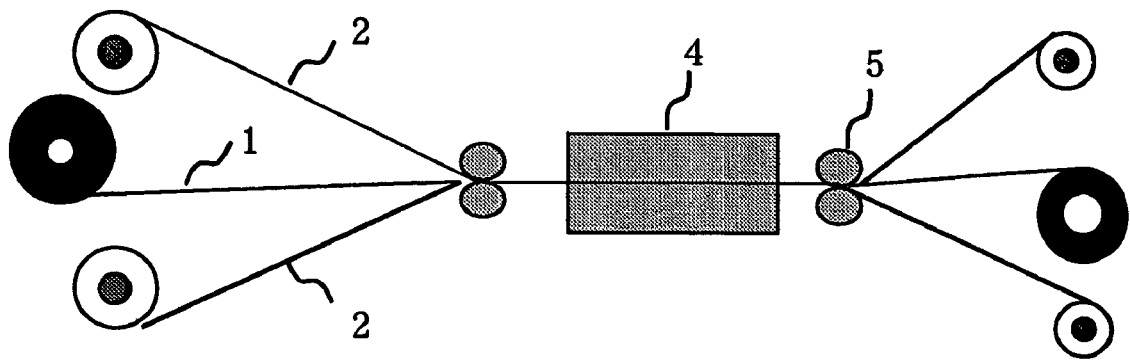
FIG. 3 is a conceptual drawing for explaining a continuous hot roll press apparatus which may be used in production of the electrode substrate of the present invention.

Then, the resin-impregnated carbon fiber paper was continuously hot-pressed using a continuous hot roll press apparatus shown in FIG. 3 to obtain a resin-cured carbon fiber paper. That is, the resin-impregnated carbon fiber paper 1 was sent out from a roll and sandwiched between mold releasing agent-coated substrates 2; they were sent into preheating zone 4 and successively into heating and pressing zone 5; then, the mold releasing agent-coated substrates 2 were removed; the resulting resin-cured carbon fiber paper was wound around a roll. In preheating zone 4, a box was placed, and the resin-impregnated carbon fiber paper was heated by blowing hot air into the box. In the heating and pressing zone was placed a heatable pressing roll capable of conducting heating and pressing simultaneously. The preheating temperature and preheating time in the preheating zone were 198° C. and 5 minutes, respectively; the temperature and pressing pressure in the heating and pressing zone were 300° C. and $4.5 \times 10^4$ N/m (line pressure), respectively.

Then, the resin-cured carbon fiber paper obtained in a size of 30 cm (width)×20 m was heated for 10 minutes in a nitrogen gas atmosphere in a continuous firing furnace of 2,000° C. to give rise to carbonization, to obtain a carbon electrode substrate of 20 m in length continuously. The electrode substrate was wound around a cylindrical paper tube of 30 cm in outer diameter. The electrode substrate had carbon fibers well dispersed and was flexible. The results of evaluation of the electrode substrate are shown in Table 2.

EXAMPLE 2

In the same manner as in Example 1, a PAN-based carbon fiber bundle of average fiber diameter of 3.5 μm and surface area ratio of 1.07 was cut to obtain short fibers having an average fiber length of 3 mm.

In the same manner as in Example 1, the short fibers were subjected to papermaking using the PVA as a binder to obtain a carbon fiber paper having a length of 50 m. The results of evaluation of the carbon fiber paper are shown in Table 1.

Then, 100 parts by mass of the carbon fiber paper was impregnated with 114 parts by mass of the resin in the same manner as in Example 1. The resin-impregnated carbon fiber paper was continuously hot-pressed using a continuous hot press apparatus having a pair of endless belts (a double-belt press apparatus: DBP), shown in FIG. 4, to obtain a resin-cured carbon fiber paper. That is, the resin-impregnated carbon fiber paper 1 was placed between mold releasing agent-coated substrates 2; the resin-impregnated carbon fiber paper 1 and the mold releasing agent-coated substrates 2 were sent between continuous belt apparatuses 3a and 3b and into preheating zone 4 and further into heating and pressing zone 5. Thereafter, as in the roll press of FIG. 3, the mold releasing agent-coated substrates 2 were removed, and the resulting resin-cured carbon fiber paper was wound around a roll. In the preheating zone 4, a box was placed; the belts were heated by blowing hot air into the box; as a result, the resin-impregnated carbon fiber paper was heated indirectly. In the heating and pressing zone was placed a heatable pressing roll capable of conducting heating and pressing simultaneously. Each of continuous belts apparatus 3a and 3b was rotated, whereby the resin-impregnated carbon fiber paper, etc. were conveyed. The preheating temperature and preheating time in the preheating zone were 198° C. and 5 minutes, respectively; the temperature and pressing pressure in the heating and pressing zone were 300° C. and $6.0 \times 10^4$ N/m (line pressure), respectively.

Then, the resin-cured carbon fiber paper obtained in a size of 30 cm (width)×50 m was carbonized in the same manner as in Example 1 to obtain an electrode substrate of 50 m in length continuously. The electrode substrate was wound around a cylindrical paper tube of 30 cm in outer diameter. The electrode substrate had carbon fibers well dispersed and was flexible. The results of evaluation of the electrode substrate are shown in Table 2.

EXAMPLE 3

In the same manner as in Example 1, a PAN-based carbon fiber bundle of average fiber diameter of 4.2 μm and surface area ratio of 1.12 was cut to obtain short fibers having an average fiber length of 3 mm.

In the same manner as in Example 1, the short fibers were subjected to papermaking using the PVA as a binder to obtain a carbon fiber paper having a length of 50 m. The results of evaluation of the carbon fiber paper are shown in Table 1.

Then, 100 parts by mass of the carbon fiber paper was impregnated with 136 parts by mass of the resin in the same manner as in Example 1. The resin-impregnated carbon fiber paper was subjected to a resin-curing treatment using a DBP, in the same manner as in Example 2. The preheating temperature and preheating time in the preheating zone were 160° C. and 5 minutes, respectively; the temperature and pressing pressure in the heating and pressing zone were 300° C. and $7.5 \times 10^4$ N/m (line pressure), respectively.

Then, the resin-cured carbon fiber paper obtained in a size of 30 cm (width)×50 m was carbonized in the same manner as in Example 1 to obtain an electrode substrate of 50 m in length continuously. The electrode substrate was wound around a cylindrical paper tube of 30 cm in outer diameter. The electrode substrate had carbon fibers well dispersed and was flexible. The results of evaluation of the electrode substrate are shown in Table 2.

EXAMPLE 4

In the same manner as in Example 3, a PAN-based carbon fiber bundle of average fiber diameter of 4.2 μm and surface area ratio of 1.12 was cut to obtain short fibers having an average fiber length of 3 mm. In the same manner as in Example 1, using the PVA as a binder, a carbon fiber paper having a length of 100 m was obtained. The results of evaluation of the carbon fiber paper are shown in Table 1.

Then, 100 parts by mass of the carbon fiber paper was impregnated with 148 parts by mass of the resin in the same manner as in Example 1. The resin-impregnated carbon fiber paper was subjected to a resin-curing treatment using the DBP, in the same manner as in Example 2. The preheating temperature and preheating time in the preheating zone were 180° C. and 5 minutes, respectively; the temperature and pressing pressure in the heating and pressing zone were 300° C. and $3.0 \times 10^4$ N/m (line pressure), respectively.

Then, the resin-cured carbon fiber paper obtained in a size of 30 cm (width)×100 m was carbonized in the same manner as in Example 1 to obtain an electrode substrate of 100 m in length continuously. The electrode substrate was wound around a cylindrical paper tube of 17 cm in outer diameter. The electrode substrate had carbon fibers well dispersed and was flexible. The results of evaluation of the electrode substrate are shown in Table 2.

EXAMPLE 5

In the same manner as in Example 1, a PAN-based carbon fiber bundle of average fiber diameter of 4 μm and surface area ratio of 1.09 was cut to obtain short fibers having an average fiber length of 3 mm.

In the same manner as in Example 1, the short fibers were subjected to papermaking using the PVA as a binder to obtain a carbon fiber paper having a length of 100 m.

Figure 5:
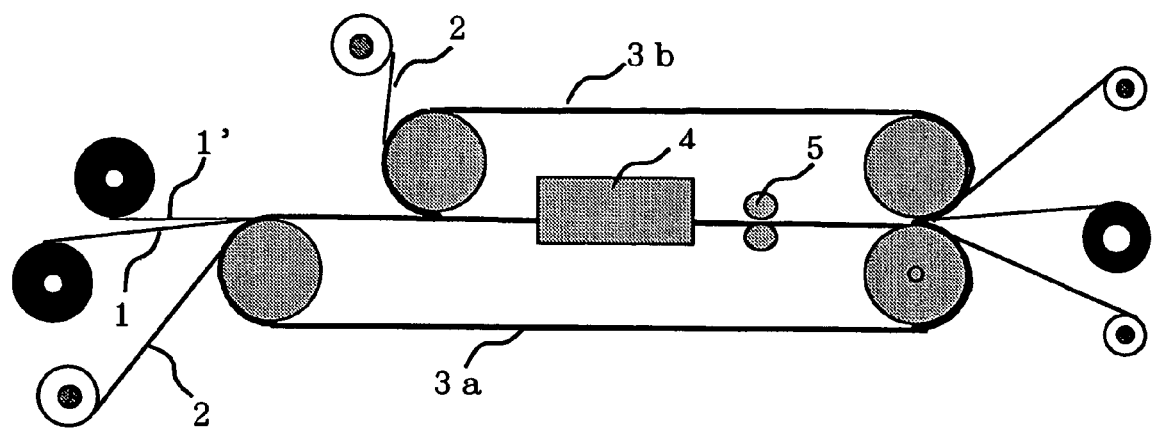
FIG. 5 is a conceptual drawing for explaining a double-belt press apparatus which may be used in production of an electrode substrate having a structure in which a plurality of carbon fiber papers are laminated.

Next, by coating the thermosetting resin on the both sides of the carbon fiber paper using a coater, 83 parts by mass of the resin was impregnated into 100 parts by mass of the carbon fiber paper. Successively, as shown in FIG. 5, two resin-impregnated carbon fiber papers 1 and 1' were laminated so that their back sides faced each other; the laminate was sandwiched between mold releasing agent-coated substrates and hot-pressed continuously using a double-belt press apparatus, for curing of the resin, to obtain a resin-cured carbon fiber paper of 30 cm (width)×100 m (length). The resin-cured carbon fiber paper was subjected to a pretreatment in a nitrogen gas atmosphere of 300° C. to 600° C. and then heated for 10 minutes in a nitrogen gas atmosphere in a continuous firing furnace of 2,000° C. for carbonization, to finally obtain a carbon electrode substrate of 100 m in length continuously. The electrode substrate was wound around a cylindrical paper tube of 17 cm in outer diameter. The electrode substrate had carbon fibers well dispersed and was flexible. The results of evaluation thereof are shown in Table 2.

EXAMPLE 6

A PAN-based carbon fiber bundle of average fiber diameter of 7.2 μm and surface area ratio of 1.13 was cut to obtain short fibers having an average fiber length of 6 mm.

In the same manner as in Example 1, the short fibers were subjected to papermaking using the PVA as a binder to obtain a carbon fiber paper having a length of 50 m.

Then, 100 parts by mass of the carbon fiber paper was impregnated with 100 parts by mass of the resin in the same manner as in Example 1. The resin-impregnated carbon fiber paper was subjected to a resin-curing treatment using the DBP, in the same manner as in Example 2.

Then, the resin-cured carbon fiber paper obtained in a size of 30 cm (width)×50 m was carbonized in the same manner as in Example 1 to obtain an electrode substrate of 50 m in length continuously. The electrode substrate was wound around a cylindrical paper tube of 30 cm in outer diameter. The electrode substrate had carbon fibers well dispersed and was flexible. The results of evaluation of the electrode substrate are shown in Table 2.

Comparative Example 1

A PAN-based carbon fiber bundle of average fiber diameter of 4.1 μm and surface area ratio of 1.02 was cut to obtain short fibers having an average fiber length of 6 mm.

In the same manner as in Example 1, the short fibers were subjected to papermaking using the PVA as a binder to obtain a carbon fiber paper having a length of 50 m. In the carbon fiber paper, however, the dispersion of carbon fibers was not uniform. The results of evaluation of the carbon fiber paper are shown in Table 1.

Then, 100 parts by mass of the carbon fiber paper was impregnated with 136 parts by mass of the resin in the same manner as in Example 1. The resin-impregnated carbon fiber paper was subjected to a resin-curing treatment using the DBP, in the same manner as in Example 2. The preheating temperature and preheating time in the preheating zone were 128° C. and 5 minutes, respectively; the temperature and pressing pressure in the heating and pressing zone were 280° C. and $7.5×10^4$ N/m (line pressure), respectively.

Then, the resin-cured carbon fiber paper obtained in a size of 30 cm (width)×50 m was carbonized in the same manner as in Example 1 to obtain a carbon electrode substrate of 50 m in length continuously. The electrode substrate was wound around a cylindrical paper tube of 30 cm in outer diameter. The results of evaluation of the electrode substrate are shown in Table 2.

EXAMPLE 7

Figure 4:
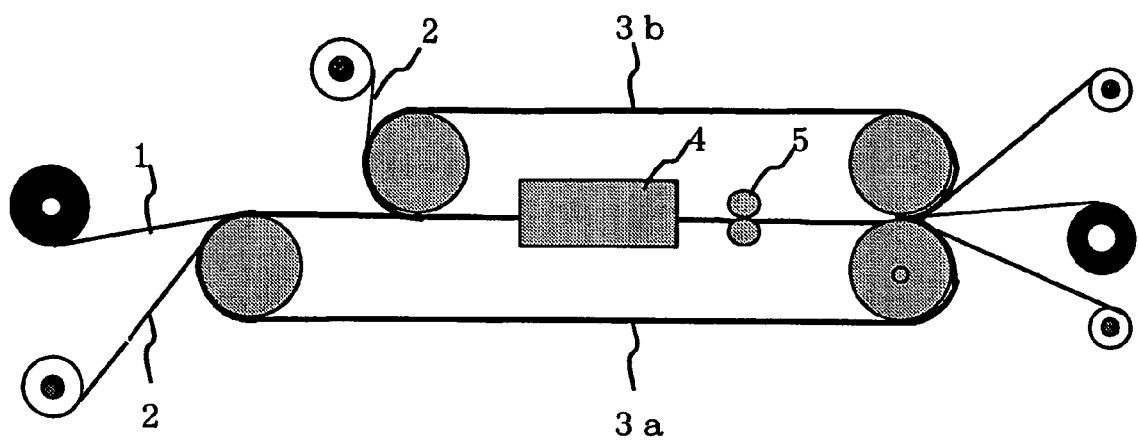
FIG. 4 is a conceptual drawing for explaining a double-belt press apparatus which may be used in production of the electrode substrate of the present invention.

As shown in FIG. 4, two resin-impregnated carbon fiber papers 1 and 1' (which were the same as in Example 1) were laminated so that their back sides faced each other. They were sandwiched between mold releasing agent-coated substrates and hot-pressed continuously using the double-belt press apparatus, under the same conditions as in Example 3, to obtain a resin-cured carbon fiber paper. The lamination configuration of the resin-impregnated carbon fiber papers is as shown in FIG. 1.

Successively, the resin-cured carbon fiber paper was treated for 10 minutes in a nitrogen gas atmosphere in a firing furnace of 600° C. (maximum temperature) and heated for 10 minutes in a continuous firing furnace of 2,000° C. for carbonization, to continuously obtain a porous carbon electrode substrate of 100 m in length.

The results of evaluation of the carbon electrode substrate are shown in Table 2.

EXAMPLE 8

In the same manner as in Example 1, the carbon short fibers and the PVA were mixed and dispersed, then the dispersion was sent out. When the web, thus sent out, passed through a net plate, high pressure water jets were applied to obtain a paper having holes. The paper was dried using a drier to obtain a carbon fiber paper having a length of 140 m. The application of water jets was conducted from a nozzle arranged above a papermaking belt, and the jet orifices of the nozzle had intervals of 1 mm and diameters of 0.1 mm. Subsequently, resin impregnation, curing by hot-pressing and firing were conducted continuously in the same manner as in Example 6 to continuously obtain a porous carbon electrode substrate having a length of 100 m.

The results of evaluation of the electrode substrate are shown in Table 2.

EXAMPLE 9

The same carbon fiber paper as used in Example 1 was used as carbon fiber paper A. Separately, a bundle of short polyacrylonitrile (PAN)-based carbon fibers having an average fiber diameter of 7 μm and an average fiber length of 6 mm was dispersed in the same manner as in Example 1, and a carbon fiber paper B was obtained. In carbon fiber paper B, the dispersion of carbon fibers was good.

Next, to 100 parts by mass of the carbon fiber paper A was adhered 90 parts by mass of the phenolic resin by a dip nip method, in the same manner as in Example 1, to obtain a resin-impregnated carbon fiber paper C.

In a similar manner, 130 parts by mass of the phenolic resin was adhered to 100 parts by mass of the carbon fiber paper B to obtain a resin-impregnated carbon fiber paper D.

Then, the resin-impregnated carbon fiber papers were continuously heated and pressed using the DBP, as shown in FIG. 4, to obtain a resin-cured carbon fiber paper E. That is, the resin-impregnated carbon fiber paper C was sent out from lower roll 1a; the resin-impregnated carbon fiber D was sent out from upper roll 1b; they were sandwiched between mold releasing agent-coated substrates 2, then sent between continuous belt apparatuses 3a and 3b, and integrated in preheating zone 4 and successively in hot-pressing zone 5. Thereafter, the mold releasing agent-coated substrates 2 were removed, and the resulting resin-cured carbon fiber paper was wound around a roll. The preheating temperature and time in the preheating zone were 150° C. and 5 minutes, respectively; and the temperature and pressing pressure in the hot-pressing zone were 250° C. and $4.5×10^4$ N/m (line pressure), respectively.

Then, the resin-cured carbon fiber paper E obtained in a size of 30 cm (width) and 20 m was heated for 10 minutes in a nitrogen gas atmosphere in a continuous firing furnace of 2,000° C. for carbonization, to continuously form a carbon electrode substrate having a length of 20 m. The electrode substrate was wound around a cylindrical paper tube of 17 cm in outer diameter. The electrode substrate had carbon fibers well dispersed and was free from warpage. The results of evaluation thereof are shown in Table 2.

EXAMPLE 10

A carbon fiber paper shown in Table 1 was obtained in the same manner as in Example 1. 56 parts by mass of the phenolic resin was adhered to 100 parts by mass of the carbon FIBER paper in the same manner as in Example 5.

Next, in the same manner as in Example 5, two such carbon fiber papers were laminated so that their back sides faced each other. Then, using the DBP in the same manner as in Example 2 except that the line pressure was changed to $4.5 \times 10^4$ N/m, there was obtained a resin-cured carbon fiber paper of 30 cm (width)×50 m. The resin-cured carbon fiber paper was carbonized in the same manner as in Example 1 to obtain an electrode substrate of 50 m in length continuously. The electrode substrate was wound around a cylindrical paper tube of 35.2 cm in outer diameter. The electrode substrate had carbon fibers well dispersed and was flexible. The results of evaluation of the electrode substrate are shown in Table 2.

EXAMPLE 11

A carbon fiber paper shown in Table 1 was obtained in the same manner as in Example 1. 69 parts by mass of the phenolic resin was adhered to 100 parts by mass of the carbon fiber paper in the same manner as in Example 5.

Next, in the same manner as in Example 5, two such carbon fiber papers were laminated so that their back sides faced each other. Then, using the DBP, there was obtained a resin-cured carbon fiber paper of 30 cm (width)×50 m. The resin-cured carbon fiber paper was carbonized in the same manner as in Example 1 to obtain an electrode substrate of 50 m in length continuously. The electrode substrate was wound around a cylindrical paper tube of 35.2 cm in outer diameter. The electrode substrate had carbon fibers well dispersed and was flexible. The results of evaluation of the electrode substrate are shown in Table 2.

EXAMPLE 12

Using the DBP in the same manner as in Example 5 except that only one resin-impregnated carbon fiber paper of Example 5 was used and the line pressure was changed to $1.5 \times 10^4$ N/m, there was produced a resin-cured carbon fiber paper. This paper was fired in the same manner as in Example 5 to obtain an electrode substrate of 50 m in length continuously. The electrode substrate was wound around a cylindrical paper tube of 17 cm in outer diameter. The electrode substrate had carbon fibers well dispersed and was flexible. The results of evaluation of the electrode substrate are shown in Table 2.

The conditions employed in each Example and the results of evaluation obtained in each Example are shown in Tables 1 and 2.

TABLE 1

Results of evaluation of each carbon fiber paper

|  | Surface area ratio of fiber | Average fiber diameter/ average length | Composition (carbon fiber/PVA) | Tensile strength ratio (MD/CMD) | Dispersion of carbon fibers |
|---|---|---|---|---|---|
| Example 1 | 1.09 | 4.0 μm/3 mm | 86/14 | 1.3 | A |
| Example 2 | 1.07 | 3.5 μm/3 mm | 86/14 | 1.5 | A |
| Example 3 | 1.12 | 4.2 μm/3 mm | 85/15 | 2.0 | A |
| Example 4 | 1.12 | 4.2 μm/3 mm | 86/14 | 2.5 | A |
| Example 5 | 1.09 | 4.0 μm/3 mm | 86/14 | 1.2 | A |
| Example 6 | 1.13 | 7.2 μm/6 mm | 86/14 | 1.4 | A |
| Example 7 | 1.09 | 4.0 μm/3 mm | 86/14 | 1.3 | A |
| Example 8 | 1.09 | 4.0 μm/3 mm | 86/14 | 1.3 | A |
| Example 10 | 1.09 | 4.0 μm/3 mm | 86/14 | 1.9 | A |
| Example 11 | 1.09 | 4.0 μm/3 mm | 86/14 | 1.4 | A |
| Comparative Example 1 | 1.02 | 4.1 μm/6 mm | 85/15 | 3.1 | C |

TABLE 2

Results of evaluation of each electrode substrate

|  | Thickness (mm) | Carbonized substrate other than carbon fiber in electrode substrate (mass %) | Bulk density (g/cm³) | Bending strength (MPa) | Deflection (mm) | Surface resistance ratio | Gas permeability coefficient (*1) | Through-plane resistivity (Ω·cm²) | Tensile strength (Mpa) | Surface roughness (μm) | Length (m) |
|---|---|---|---|---|---|---|---|---|---|---|---|
| Ex. 1 | 0.227 | 46.0 | 0.51 | 91 | 1.59 | 1.29 | 145 (14.8) | 5.19 | 41.0 | 3.7 | 20 |
| Ex. 2 | 0.244 | 44.1 | 0.51 | 83 | 1.92 | 1.16 | 105 (10.7) | 8.19 | 43.2 | 3.4 | 50 |
| Ex. 3 | 0.180 | 49.2 | 0.63 | 197 | 2.92 | 1.77 | 32 (3.24) | 5.15 | 41.1 | 3.8 | 50 |
| Ex. 4 | 0.228 | 52.1 | 0.49 | 81 | 2.40 | 1.88 | 192 (19.5) | 5.70 | 40.6 | 3.9 | 100 |
| Ex. 5 | 0.164 | 27.0 | 0.43 | 83 | 3.04 | 1.17 | 191 (19.5) | 4.47 | 38.5 | 4.1 | 100 |

TABLE 2-continued

Results of evaluation of each electrode substrate

| | Thickness (mm) | Carbonized substrate other than carbon fiber in electrode substrate (mass %) | Bulk density (g/cm$^3$) | Bending strength (MPa) | Deflection (mm) | Surface resistance ratio | Gas permeability coefficient (*1) | Through-plane resistivity ($\Omega \cdot cm^2$) | Tensile strength (Mpa) | Surface roughness (μm) | Length (m) |
|---|---|---|---|---|---|---|---|---|---|---|---|
| Ex. 6 | 0.190 | 37.5 | 0.41 | 50 | 1.90 | 1.25 | 2000 (204) | 5.12 | 25.7 | 7.0 | 50 |
| Ex. 7 | 0.210 | 47.3 | 0.55 | 100 | 2.90 | 1.01 | 160 (16.3) | 4.10 | 36.3 | 3.9 | 100 |
| Ex. 8 | 0.180 | 39.1 | 0.42 | 91 | 3.20 | 1.10 | 650 (66.4) | 3.70 | 40.0 | 4.1 | 100 |
| Ex. 9 | 0.200 | 33.8 | 0.51 | 91 | 2.00 | 1.29 | 1466 (150) | 5.19 | 29.4 | Upper surface 6.8 Lower surface 4.0 | 100 |
| Ex. 11 | 0.213 | 21.9 | 0.37 | 50 | 1.51 | 1.72 | 428 (43.8) | 6.00 | 25.2 | 4.9 | 50 |
| Ex. 12 | 0.179 | 24.5 | 0.37 | 54 | 2.50 | 1.09 | 288 (29.5) | 5.20 | 37.0 | 4.2 | 50 |
| Ex. 13 | 0.106 | 28.7 | 0.33 | 36 | 5.2 | 1.12 | 502 (51.4) | 3.95 | 25.0 | 4.0 | 50 |
| Comp. Ex. 1 | 0.232 | 50.3 | 0.55 | 92 | 1.21 | 2.93 | 209 (21.3) | 5.21 | 35.0 | 3.5 | 50 |

*1: ml · mm/hr · cm$^2$ · mmAq (ml · mm/hr · cm$^2$ · Pa)

INDUSTRIAL APPLICABILITY

According to the present invention, there can be obtained a carbon electrode substrate for a fuel cell, which has carbon fibers dispersed well and is flexible, and a carbon fiber paper suitable for production of the electrode substrate. By using the porous carbon electrode substrate for a fuel cell according to the present invention, there can be obtained a fuel cell, particularly a solid polymer electrolyte fuel cell, having superior performances.

The invention claimed is:

1. A porous carbon electrode substrate for a fuel cell comprising a carbon fiber paper having a surface area ratio of 1.05 or more, said porous carbon electrode substrate having a structure in which at least two carbon fiber papers, each containing a carbonized resin, are laminated, and at least one of the carbon fiber papers is the carbon fiber paper comprising carbon fibers having a surface area ratio of 1.05 or more, said porous carbon electrode substrate having a structure in which a plurality of carbon fiber papers, each containing a carbonized resin, are the same kind and are laminated in such a state that the same sides of the papers are each directed outward.

2. A porous carbon electrode substrate for a fuel cell according to claim 1, wherein said electrode substrate has a thickness of at least 0.05 mm and at most 0.5 mm and a bulk density of at least 0.3 g/cm$^3$ and at most 0.8 g/cm$^3$, and has a bending strength of 50 MPa or more and a deflection of 1.5 mm or more at the time of bending measured by a three-point bending test under the conditions of a strain speed of 10 mm/min, a distance between the supporting points of 2 cm and a test specimen width of 1 cm.

3. A porous carbon electrode substrate for a fuel cell according to claim 1, which has a tensile strength of 25 MPa or more.

4. A porous carbon electrode substrate for a fuel cell according to claim 1, which contains a carbonized resin in an amount of at least 10% by mass and at most 50% by mass.

5. A porous carbon electrode substrate for a fuel cell according to claim 1, wherein a ratio of the MD surface resistance which is a surface resistance in the papermaking direction of the carbon fiber paper and the CMD surface resistance which is a surface resistance in the width direction which forms a 90 degree angle with the papermaking direction, is at least 1.0 and at most 2.5 in terms of MD surface resistance/CMD surface resistance.

6. A porous carbon electrode substrate for a fuel cell comprising a carbon fiber paper having a surface area ratio of 1.05 or more, said porous carbon electrode substrate having a structure in which at least two carbon fiber papers, each containing a carbonized resin, are laminated, and at least one of the carbon fiber papers is the carbon paper comprising carbon fibers having a surface area ratio of 1.05 or more, wherein the carbon fiber paper contains a carbonized resin, besides a first carbon fiber paper which is the carbon fiber paper comprising carbon fibers having a surface area ratio of 1.05 or more, at least one second carbon fiber paper which is a carbon fiber paper comprising carbon fibers having an average diameter of at least 6 μm and at most 20 μ and an average fiber length of at least 2 mm and at most 18 mm, said porous carbon electrode substrate being windable around a roll of 40 cm or less in outer diameter and has a length of 1 m or more.

7. A porous carbon electrode substrate for a fuel cell according to claim 6, wherein said electrode substrate has a thickness of at least 0.05 mm and at most 0.5 mm and a bulk density of at least 0.3 g/cm$^3$ and at most 0.8 g/cm$^3$, and has a bending strength of 50 MPa or more and a deflection of 1.5 mm or more at the time of bending measured by a three-point bending test under the conditions of a strain speed of 10 mm/min, a distance between the supporting points of 2 cm and a test specimen width of 1 cm.

8. A porous carbon electrode substrate for a fuel cell according to claim 6, which has a tensile strength of 25 MPa or more.

9. A porous carbon electrode substrate for a fuel cell according to claim 6, which contains a carbonized resin in an amount of at least 10% by mass and at most 50% by mass.

10. A porous carbon electrode substrate for a fuel cell according to claim 6, wherein a ratio of the MD surface resistance which is a surface resistance in the papermaking direction of the carbon fiber paper and the CMD surface resistance which is a surface resistance in the width direction which forms a 90 degree angle with the papermaking direction, is at least 1.0 and at most 2.5 in terms of MD surface resistance/CMD surface resistance.

11. A porous carbon electrode substrate for a fuel cell according to claim 1, which is windable around a roll of 40 cm or less in outer diameter and has a length of 1 m or more.

12. A porous carbon electrode substrate for a fuel cell according to claim 1 or 6, wherein said porous carbon electrode substrate has a structure in which at least two carbon fiber papers, each containing a carbonized resin, are laminated, and the carbon fiber paper comprising carbon fibers having a surface area ratio of 1.05 or more is arranged as at least one outermost layer of the electrode substrate, and the outer side of said outermost layer carbon fiber paper has a surface roughness of 5 µm or less.

13. A porous carbon electrode substrate for a fuel cell according to claim 12, wherein said electrode substrate has a thickness of at least 0.05 mm and at most 0.5 mm and a bulk density of at least 0.3 g/cm$^3$ and at most 0.8 g/cm$^3$, and has a bending strength of 50 MPa or more and a deflection of 1.5 mm or more at the time of bending measured by a three-point bending test under the conditions of a strain speed of 10 mm/min, a distance between the supporting points of 2 cm and a test specimen width of 1 cm.

14. A porous carbon electrode substrate for a fuel cell according to claim 12, which has a tensile strength of 25 MPa or more.

15. A porous carbon electrode substrate for a fuel cell according to claim 12, which contains a carbonized resin in an amount of at least 10% by mass and at most 50% by mass.

16. A porous carbon electrode substrate for a fuel cell according to claim 12, wherein a ratio of the MD surface resistance which is a surface resistance in the papermaking direction of the carbon fiber paper and the CMD surface resistance which is a surface resistance in the width direction which forms a 90 degree angle with the papermaking direction, is at least 1.0 and at most 2.5 in terms of MD surface resistance/CMD surface resistance.

* * * * *